United States Patent
Chu et al.

(10) Patent No.: US 8,683,147 B2
(45) Date of Patent: *Mar. 25, 2014

(54) DATA ACCESSING METHOD FOR FLASH MEMORY STORAGE DEVICE HAVING DATA PERTURBATION MODULE, AND STORAGE SYSTEM AND CONTROLLER USING THE SAME

(71) Applicant: Phison Electronics Corp., Miaoli (TW)

(72) Inventors: Chien-Hua Chu, Hsinchu County (TW); Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/902,404

(22) Filed: May 24, 2013

(65) Prior Publication Data

US 2013/0262755 A1    Oct. 3, 2013

Related U.S. Application Data

(63) Continuation of application No. 13/418,810, filed on Mar. 13, 2012, now Pat. No. 8,478,949, which is a continuation of application No. 12/210,406, filed on Sep. 15, 2008, now Pat. No. 8,176,267.

(30) Foreign Application Priority Data

Jul. 9, 2008  (TW) .............................. 97125974 A

(51) Int. Cl.
G06F 12/00  (2006.01)
(52) U.S. Cl.
USPC ............................ 711/154; 711/103; 711/203

(58) Field of Classification Search
USPC ........................................................ 711/103
See application file for complete search history.

(56) References Cited

U.S. PATENT DOCUMENTS

| | | |
|---|---|---|
| 5,404,485 A | 4/1995 | Ban |
| 5,928,370 A | 7/1999 | Asnaashari |
| 6,549,446 B2 | 4/2003 | Morley et al. |
| 6,684,289 B1 | 1/2004 | Gonzalez et al. |
| 6,742,078 B1 | 5/2004 | Chien et al. |
| 7,139,864 B2 | 11/2006 | Bennett et al. |
| 7,185,208 B2 | 2/2007 | Gorobets |
| 7,716,415 B2 | 5/2010 | Sharon |
| 8,176,267 B2 * | 5/2012 | Chu et al. ...................... 711/154 |
| 8,478,949 B2 * | 7/2013 | Chu et al. ...................... 711/154 |
| 2005/0166087 A1 | 7/2005 | Gorobets |
| 2005/0213393 A1 | 9/2005 | Lasser |
| 2007/0168837 A1 | 7/2007 | Murin |
| 2008/0263369 A1 | 10/2008 | Min et al. |

* cited by examiner

Primary Examiner — Reba I Elmore
(74) Attorney, Agent, or Firm — J.C. Patents

(57) ABSTRACT

A data accessing method, and a storage system and a controller using the same are provided. The data accessing method is suitable for a flash memory storage system having a data perturbation module. The data accessing method includes receiving a read command from a host and obtaining a logical block to be read and a page to be read from the read command. The data accessing method also includes determining whether a physical block in a data area corresponding to the logical block to be read is a new block and transmitting a predetermined data to the host when the physical block corresponding to the logical block to be read is a new block. Thereby, the host is prevented from reading garbled code from the flash memory storage system having the data perturbation module.

42 Claims, 8 Drawing Sheets

| Logical block | Physical block | Indicator |
|---|---|---|
| L0 | 130-0 | 1 |
| L1 | 130-1 | 1 |
| ⋮ | ⋮ | ⋮ |
| LK | 130-K | 1 |

FIG. 4B

DATA ACCESSING METHOD FOR FLASH MEMORY STORAGE DEVICE HAVING DATA PERTURBATION MODULE, AND STORAGE SYSTEM AND CONTROLLER USING THE SAME

CROSS-REFERENCE TO RELATED APPLICATION

This is a continuation application of and claims priority benefit of U.S. application Ser. No. 13/418,810, filed on Mar. 13, 2012, which is a continuation application of and claims priority benefit of U.S. application Ser. No. 12/210,406, filed on Sep. 15, 2008, which claims the priority benefit of Taiwan patent application serial no. 97125974, filed on Jul. 9, 2008. The entirety of each of the above-mentioned patent applications is hereby incorporated by reference herein and made a part of this specification.

BACKGROUND

1. Technology Field

The present invention generally relates to a data accessing method, and more particularly, to a data accessing method which can prevent a host from reading garbled codes, and a flash memory storage system and a controller using the same.

2. Description of Related Art

Along with the widespread of digital cameras, camera phones, and MP3 in recently years, the consumers' demand to storage media has increased drastically too. Flash memory is one of the most adaptable memories for such battery-powered portable products due to its characteristics such as data non-volatility, low power consumption, small volume, and non-mechanical structure. A memory card is a storage device which uses a NAND flash memory as its storage medium. Memory card has been broadly adopted for storing personal data due to its small volume, large storage capacity, and high portability. Thereby, flash memory has become one of the most focused electronic products in recent years.

Conventionally, the firmware executed by a controller of a flash memory storage system is stored in a programmable read-only memory (PROM) of the controller, and the firmware is loaded into a static random access memory (SRAM) of the controller to be executed during the operation of the flash memory storage system. In order to reduce the size of the storage device and update/modify the firmware conveniently, a technique for directly storing the firmware in a flash memory of a flash memory storage system and loading the firmware into the controller only when the controller is about to work has been developed. According to this technique, a data perturbation module (or an encoding module) is usually implemented and a data is encoded into a garbled code before it is transmitted to the flash memory. Besides, after the data is read from the flash memory, the data is decoded to restore the original data. As described above, the security of the firmware or other important data transmitted between the controller and the flash memory is protected.

However, a card activation process has to be performed to a new flash memory in a flash memory storage device when the flash memory storage device is just manufactured, wherein the card activation process is to initialize each new block in the flash memory (i.e., setting the data at each page address in each block to be 0xFF). In particular, this initialization action is not a write command and accordingly the data is not encoded by the data perturbation module. However, when an end-user system issues a read command to a new block in the new flash memory storage device, the data 0xFF stored in the new block is decoded by the data perturbation module and accordingly the end-user system receives an unrecognizable garbled code. Accordingly, a data accessing method which can prevent a host from reading garbled code from a flash memory storage device having a data perturbation module is required.

SUMMARY

Accordingly, the present invention is directed to a data accessing method which can prevent a host from reading garbled codes from a flash memory storage system having a data perturbation module.

The present invention is directed to a controller, wherein a memory management module manages and reads new blocks of a flash memory through foregoing data accessing method such that a host is prevented from reading garbled codes from a flash memory storage system having a data perturbation module.

The present invention is further directed to a storage system, wherein a controller manages and reads new blocks of a flash memory through foregoing data accessing method such that a host is prevented from reading garbled codes from a flash memory storage system having a data perturbation module.

The present invention provides a data accessing method suitable for accessing a flash memory storage device having a data perturbation module, wherein a flash memory of the flash memory storage device has a plurality of physical blocks, and these physical blocks are grouped into at least a data area and a spare area. The data accessing method includes receiving a read command from a host and obtaining a logical block to be read and a page to be read from the read command. The data accessing method also includes determining whether a physical block in the data area corresponding to the logical block to be read is a new block and transmitting a predetermined data to the host when the physical block corresponding to the logical block to be read is a new block.

According to an embodiment of the present invention, the predetermined data is 0x00 or 0xFF.

According to an embodiment of the present invention, the data accessing method further includes recording an indicator for each physical block to indicate that the physical block is a new block during a card activation process performed to the flash memory storage device. The step for determining whether a physical block in the data area corresponding to the logical block to be read is a new block includes determining whether the physical block in the data area corresponding to the logical block to be read is a new block according to the indicator. It is determined that the physical block corresponding to the logical block to be read is a new block if the physical block corresponding to the logical block to be read has the indicator.

According to an embodiment of the present invention, the data accessing method further includes writing the predetermined data into a predetermined page of each physical block during the card activation process performed to the flash memory storage device, and the step for transmitting the predetermined data to the host when the physical block corresponding to the logical block to be read is a new block includes reading data from the predetermined page of the physical block corresponding to the logical block to be read.

According to an embodiment of the present invention, the predetermined page is a first page of the physical block.

According to an embodiment of the present invention, the data accessing method further includes writing the predetermined data into all the pages of one of the physical blocks in the spare area during the card activation process performed to the flash memory storage device, and the step for transmitting the predetermined data to the host when the physical block corresponding to the logical block to be read is a new block includes reading data from a page corresponding to the page to be read in the one of the physical blocks.

According to an embodiment of the present invention, the step for transmitting the predetermined data to the host when the physical block corresponding to the logical block to be read is a new block includes changing the data read from the physical block corresponding to the logical block to be read into the predetermined data through hardware or firmware.

According to an embodiment of the present invention, the data accessing method further includes decoding the data 0xFF in each physical block by using the data perturbation module and recording the decoded data 0xFF into a decode table during the card activation process performed to the flash memory storage device. The step for determining whether the physical block in the data area corresponding to the logical block to be read is a new block includes comparing the data read from the physical block corresponding to the logical block to be read with the data recorded in the decode table. It is determined that the physical block corresponding to the logical block to be read is a new block if the data read from the physical block corresponding to the logical block to be read is the same as the data recorded in the decode table.

According to an embodiment of the present invention, the data accessing method further includes recording the indicator in a logical-physical mapping table.

According to an embodiment of the present invention, the data accessing method further includes recording the indicator in a redundant area of each physical block.

The present invention provides a flash memory storage system including a flash memory, a connector, and a controller. The flash memory is used for storing data, wherein the flash memory includes a plurality of physical blocks, and these physical blocks are grouped into at least a data area and a spare area. The connector is used for connecting to a host. The controller is electrically connected to the flash memory and the connector, and the controller includes a microprocessor unit, a data perturbation module, a flash memory interface, a buffer memory, and a memory management module. The microprocessor unit obtains a logical block to be read and a page to be read from a read command received from a host. The data perturbation module is electrically connected to the microprocessor unit for decoding a data read from the flash memory. The flash memory interface is electrically connected to the microprocessor unit for accessing the flash memory. The buffer memory is electrically connected to the microprocessor unit for temporarily storing data. The memory management module is electrically connected to the microprocessor unit, and the memory management module determines whether a physical block in the data area corresponding to the logical block to be read is a new block and transmits a predetermined data to the host when the physical block corresponding to the logical block to be read is a new block.

According to an embodiment of the present invention, the predetermined data is 0x00 or 0xFF.

According to an embodiment of the present invention, the memory management module records an indicator for each physical block to indicate that the physical block is a new block during a card activation process performed to the flash memory storage device, and the memory management module determines whether the physical block in the data area corresponding to the logical block to be read is a new block according to the indicator.

According to an embodiment of the present invention, the memory management module writes the predetermined data into a predetermined page of each physical block during the card activation process, and the memory management module reads data from the predetermined page of the physical block corresponding to the logical block to be read when the physical block corresponding to the logical block to be read is a new block.

According to an embodiment of the present invention, the predetermined page is a first page of the physical block.

According to an embodiment of the present invention, the memory management module writes the predetermined data into all the pages of one of the physical blocks in the spare area during the card activation process, and the memory management module reads data from a page corresponding to the page to be read in the one of the physical blocks when the physical block corresponding to the logical block to be read is a new block.

According to an embodiment of the present invention, the memory management module changes the data read from the physical block corresponding to the logical block to be read into the predetermined data when the physical block corresponding to the logical block to be read is a new block.

According to an embodiment of the present invention, the memory management module decodes the data 0xFF in each physical block by using the data perturbation module and records the decoded data 0xFF into a decode table during the card activation process, and the memory management module determines that the physical block corresponding to the logical block to be read is a new block when the data read from the physical block corresponding to the logical block to be read is the same as the data recorded in the decode table.

According to an embodiment of the present invention, the memory management module records the indicator in a logical-physical mapping table.

According to an embodiment of the present invention, the memory management module records the indicator in a redundant area of each physical block.

According to an embodiment of the present invention, the flash memory storage device is a flash drive, a memory card, or a solid state drive (SSD).

In the present invention, whether a physical block is a new block is determined before a data is transmitted to a host, and a predetermined data is transmitted to the host when the physical block is a new block. Thereby, the host is prevented from reading garbled code.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4B illustrates an example of a logical-physical mapping table according to the second embodiment of the present invention.

DESCRIPTION OF THE EMBODIMENTS

Figure 1:
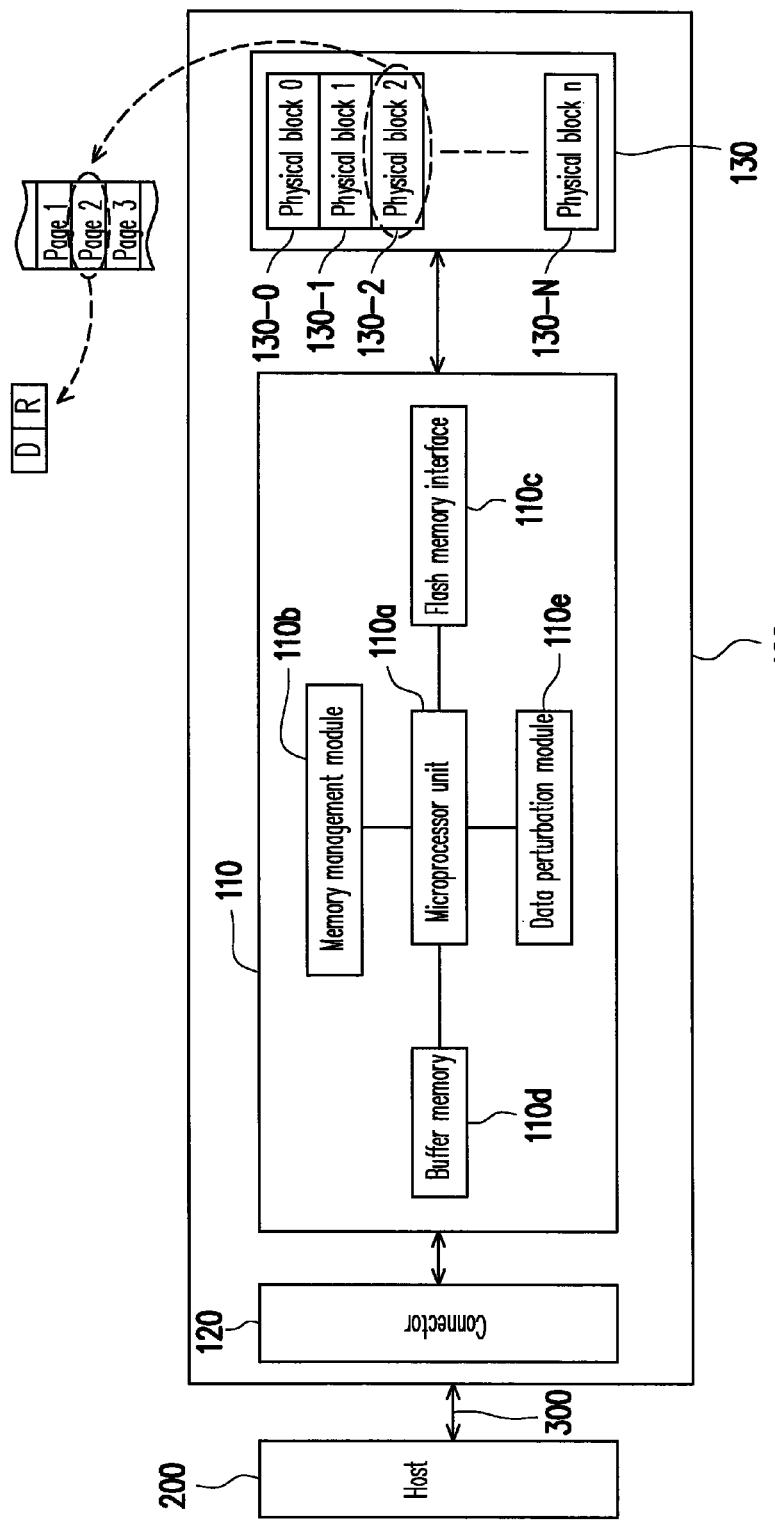
FIG. 1 is a schematic block diagram of a flash memory storage system according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic block diagram of a flash memory storage system according to an embodiment of the present invention. Referring to FIG. 1, the flash memory storage system 100 includes a controller 110, a connector 120, and a flash memory 130.

The flash memory storage system 100 usually works together with a host 200 to allow the host 200 to write data into or read data from the flash memory storage system 100. In the present embodiment, the flash memory storage system 100 is a solid state drive (SSD). However, in another embodiment of the present invention, the flash memory storage system 100 may also be a memory card or a flash drive.

The controller 110 executes a plurality of commands implemented as hardware or firmware and coordinates with the connector 120 and the flash memory 130 to perform various data operations, such as data storing, reading, and erasing, etc. The controller 110 includes a microprocessor unit 110a, a memory management module 110b, a flash memory interface 110c, a buffer memory 110d, and a data perturbation module 110e.

The microprocessor unit 110a coordinates with the memory management module 110b, the flash memory interface 110c, the buffer memory 110d and a data perturbation module 110e to perform various operations of the flash memory storage system 100. For example, the microprocessor unit 110a works together with the memory management module 110b, the flash memory interface 110c the buffer memory 110d and a data perturbation module 110e to read and write data according to a read command or a write command it receives.

The memory management module 110b is electrically connected to the microprocessor unit 110a. The memory management module 110b manages the flash memory 130. For example, the memory management module 110b has machine instructions for executing wear levelling, managing bad blocks, and maintaining a mapping table, etc. In particular, the memory management module 110b executes a data accessing method as described below with reference to several embodiments of the present invention.

It should be mentioned that in the present embodiment, the memory management module 110b is implemented as a hardware. However, in another embodiment of the present invention, the memory management module 110b may also be implemented as a firmware. When the memory management module 110b is implemented as a firmware, the memory management module 110b has a plurality of machine instructions which can be executed by the microprocessor unit 110a, and when the flash memory storage system 100 is in operation, the memory management module 110b is loaded into the buffer memory 110d to be executed by the microprocessor unit 110a.

The flash memory interface 110c is electrically connected to the microprocessor unit 110a for accessing the flash memory 130. Namely, data to be written into the flash memory 130 by the host 200 is converted by the flash memory interface 110c into a format acceptable to the flash memory 130.

The buffer memory 110d is electrically connected to the microprocessor unit 110a for temporarily storing system data (such as a logical-physical mapping table) or data to be read or written by the host 200. In the present embodiment, the buffer memory 110d is a static random access memory (SRAM). However, the present invention is not limited thereto, and a dynamic random access memory (DRAM), a magnetoresistive random access memory (MRAM), a phase change random access memory (PRAM), or other suitable memories may also be applied in the present invention.

The data perturbation module 110e is electrically connected to the microprocessor unit 110a for converting a sequence data into a non-sequence data or a non-sequence data into a sequence data. To be specific, to ensure data security, in the present embodiment, all the data transmitted when the controller 110 writes data into or read data from the flash memory 130 is encoded or decoded by the data perturbation module 110e.

In an embodiment of the present invention, the data perturbation module 110e switches data of at least two bytes in a received data. For example, when the sequence data it receives is "01 02 03 04 05 06 07 08 11 12 13 14 15 16 17 18", the data perturbation module 110e encodes the sequence data into "05 06 07 08 01 02 03 04 15 16 17 18 11 12 13 14". Contrarily, when the non-sequence data it receives is "05 06 07 08 01 02 03 04 15 16 17 18 11 12 13 14", the data perturbation module 110e decodes the non-sequence data into "01 02 03 04 05 06 07 08 11 12 13 14 15 16 17 18". However, foregoing example of data switching is not intended to restricting the scope of the present invention, and other data switching or re-arranging pattern can be easily implemented by those skilled in the art according to the present disclosure.

In the present embodiment, the data perturbation module 110e scrambles a data by changing the sequence of the data; however, in another embodiment of the present invention, the data perturbation module 110e may also scramble a data by inverting each bit of the data (for example, change "0" into "1" or "1" into "0") or by using an algorithm.

In addition, even though not shown in the present embodiment, the controller 110 may further include general function modules for controlling the flash memory, such as an error correction module and a power management module.

The connector 120 connects to the host 200 through a bus 300. In the present embodiment, the connector 120 is a PCI Express connector. However, the present invention is not limited thereto, and the connector 120 may also be a USB connector, an IEEE 1394 connector, a SATA connector, a MS connector, a MMC connector, a SD connector, a CF connector, an IDE connector, or other suitable data transmission connectors.

The flash memory 130 is electrically connected to the controller 110 for storing data. The flash memory 130 is substantially divided into a plurality of physical blocks 130-0~130-N. Generally speaking, data in a flash memory is erased in unit of physical blocks. Namely, each physical block contains the smallest number of memory cells which are erased together. Each physical block is usually divided into a plurality of pages. Page is usually the smallest programming unit. However, it should be noted that in some different flash memory designs, the smallest programming unit may also be sector, namely, a page has a plurality of sectors and each sector is served as the smallest programming unit. In other words, page is served as the smallest unit for reading and writing data. A page is usually divided into a user data area D and a redundant area R, wherein the user data area D is used for storing user data, and the redundant area R is used for storing system data (for example, an error correcting code (ECC)).

Generally speaking, the user data area D has 512 bytes and the redundant area R has 16 bytes in order to correspond to the size of sectors in a disk drive. In other words, a page is a sector. However, a page may also be composed of a plurality of sectors. For example, a page may include four sectors.

Generally speaking, a physical block can be composed of any number of pages, such as 64 pages, 128 pages, and 256 pages, etc. The physical blocks 130-0~130-N are usually grouped into several zones. By managing the operations of a memory based on zones, parallelism of the operations can be increased and the management can be simplified.

The operation of the flash memory 130 will be described according to the present invention with reference to accompanying drawings. It should be understood that the terms "select", "move", and "substitute" used in following description only refer to logical operations performed to the flash memory 130. In other words, the physical positions of the blocks in the flash memory are not changed; instead, these blocks in the flash memory 130 are only operated logically.

Figure 2:
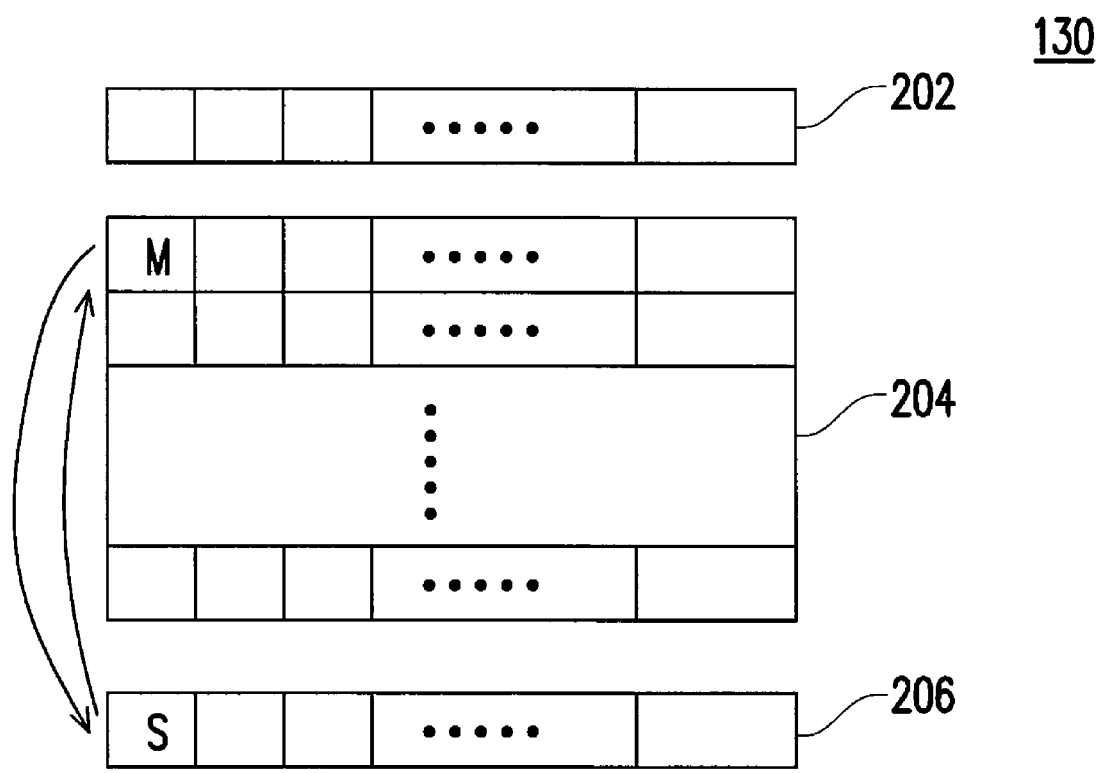
FIG. 2 is a detailed block diagram of a flash memory and operations thereof according to an embodiment of the present invention.

FIG. 2 is a detailed block diagram of the flash memory 130 and the operations thereof according to an embodiment of the present invention.

Referring to FIG. 2, in the present embodiment, in order to program (i.e., write and erase) the flash memory 130 more efficiently, the physical blocks 130-1~130-N in the flash memory 130 are logically grouped into a system area 202, a data area 204, and a spare area 206. Generally speaking, more than 90% of the physical blocks in the flash memory 130 belong to the data area 204.

Physical blocks in the system area 202 are used for recording system data, such as number of zones in the flash memory 130, number of physical blocks in each zone, number of pages in each physical block, and the logical-physical mapping table, etc.

Physical blocks in the data area 204 are used for storing user data, and these physical blocks are actually the blocks corresponding to the logical block addresses (LBA) operated by the host 200.

Physical blocks in the spare area 206 are used for substituting the physical blocks in the data area 204. Thus, the physical blocks in the spare area 206 are blank or available blocks, namely, no data is recorded in these blocks or data recorded in these blocks has been marked as invalid data. To be specific, an erasing operation has to be performed before writing data to an address in which data has been recorded. However, as described above, data is written into a flash memory in unit of pages while erased from the same in unit of blocks. Since the erase unit is larger than the write unit, valid pages in a physical block have to be copied to another physical block before data in the physical block is erased. Accordingly, to write a new data into a physical block M in the data area 204 which already contains a data, a physical block S is first selected from the spare area 206, and the valid data in the physical block M is copied to the physical block S and the new data is also written into the physical block S. After that, the physical block M is erased and moved to the spare area 206, and at the same time, the physical block S is moved to the data area 204. It should be understood that moving the physical block M to the spare area 206 and the physical block S to the data area 204 is to link the physical block M to the spare area 206 and the physical block S to the data area 204 logically. It should be understood by those having ordinary knowledge in the art that the logical relationship between blocks in the data area 204 can be maintained through a logical-physical mapping table.

A card activation process is usually performed to the flash memory storage system 100 right after the flash memory storage system 100 is manufactured. During the card activation process, all the physical blocks 130-0~130-N of the flash memory 130 are initialized to set the data therein to be 0xFF. As described above, the physical blocks 130-0~130-N of the flash memory 130 are grouped into the system area, the data area, and the spare area, wherein the physical blocks in the data area are blocks containing valid data and to be accessed by the host 200 (i.e., blocks corresponding to the logical blocks), and the physical blocks in the spare area are used for substituting the blocks in the data area while executing write commands. Thus, the problem of getting garbled code just is occurred in the case of reading physical blocks (i.e., new blocks) which are just initialized (i.e., data stored therein is 0xFF). That is, when the physical blocks in the data area and the physical blocks in the spare area once are written data with the above-mentioned substituting operation, the problem of getting garbled code is not occurred. According to the data accessing method provided by the present invention, whether a physical block is a new block is determined before a data is transmitted to the host 200, and if the physical block is a new block, a predetermined data (for example, 0x00 or 0xFF) is transmitted to the host 200 so as to prevent the host 200 from receiving garbled code. Embodiments of the present invention will be described below with reference to accompanying drawings.

[First Embodiment]

As described above, a card activation process is performed to the flash memory storage system 100 after the flash memory storage system 100 is manufactured. Herein, the memory management module 110b uses one bit in a redundant area R of a first page in each of the physical blocks for indicating that the physical block is a new block (i.e., no data has been written therein). For example, the memory management module 110b records "1" in this bit for indicating that the physical block is a new block and records "0" for indicating that the physical block is not a new block. Meanwhile, during the card activation process, the memory management module 110b writes data 0x00 into a data area D of the first page in each of the physical blocks. In particular, the data 0x00 is encoded by the data perturbation module 110e and written as a garbled code into the data area D of the first page in each physical block. It should be understood that herein the data 0x00 (i.e., the predetermined data) is written into the first page of the physical block; however, the present invention is not limited thereto, and in another embodiment of the present invention, the predetermined data may also be written into another page of the physical block.

It should be mentioned that subsequently, when a data is written into a physical block which is indicated as a new block during the operation of the flash memory storage system 100, the memory management module 110b changes the indicator of the physical block to indicate that the physical block is not a new block. In particular, if the data is written into only some pages of the physical block which is indicated as a new block, data 0x00 is written into the other pages to make sure that all the pages in the physical block have been written.

In an embodiment of the present invention, when the host 200 desires to read data from the flash memory storage system 100, the memory management module 110b determines whether the physical block corresponding to the page the host 200 desires to read is a new block. If the page to be read is in a new block, the memory management module 110*b* reads the first page of the physical block and transmits the data therein to the host 200. To be more specific, if the page to be read is in a new block, then the data stored in this page is 0xFF, and a garbled code is produced when the data 0xFF is decoded by the data perturbation module 110*e*, and accordingly the host 200 receives the unrecognizable garbled code from this page. Thus, in the present embodiment, if the physical block corresponding to the page to be read is a new block, the memory management module 110*b* reads data from the first page of the physical block and transmits the data to the host, wherein because the data in the first page of the physical block is stored as the data 0x00 encoded by the data perturbation module 110*e*, data 0x00 is obtained when the data read from the first page of the physical block is decoded by the data perturbation module 110*e*. Accordingly, the host 200 is prevented from reading garbled code.

In the present embodiment, the indicator indicating whether a physical block is a new block is recorded in the redundant area R of the first page in the physical block. However, the present invention is not limited thereto, and in another embodiment of the present invention, an indicator indicating whether a physical block corresponding to a logical block is a new block may also be recorded in a logical-physical mapping table.

Figure 3A:
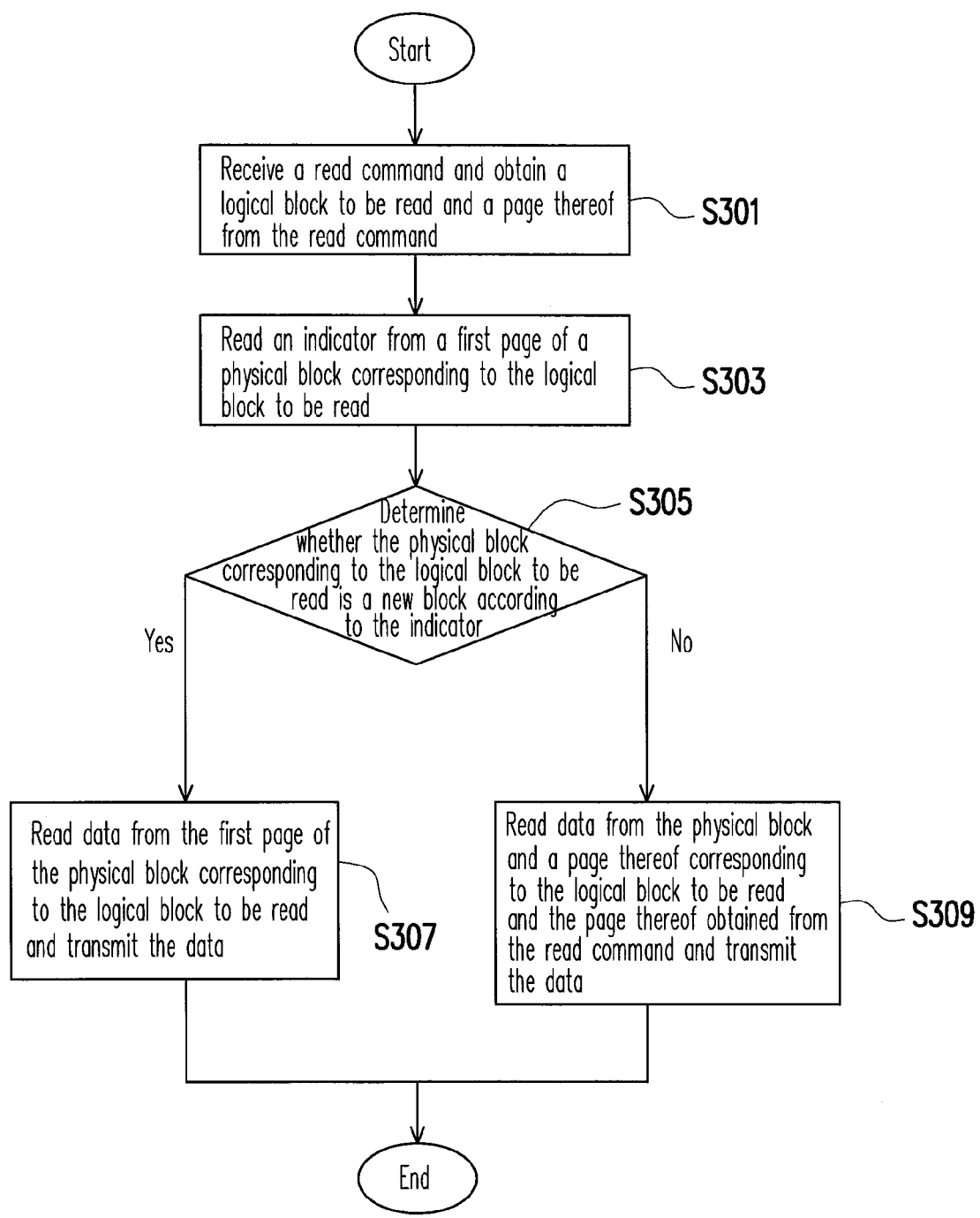
FIG. 3A is a flowchart of a data accessing method according to a first embodiment of the present invention.

FIG. 3A is a flowchart of a data accessing method according to the first embodiment of the present invention.

Referring to FIG. 3A, in step S301, the flash memory storage system 100 receives a read command from the host 200, and the microprocessor unit 110*a* obtains a logical block to be read and a page thereof from the read command. Then, in step S303, the memory management module 110*b* reads the indicator from the first page of a physical block corresponding to the logical block to be read, and in step S305, the memory management module 110*b* determines whether the physical block corresponding to the logical block to be read is a new block according to the indicator.

Figure 3B:
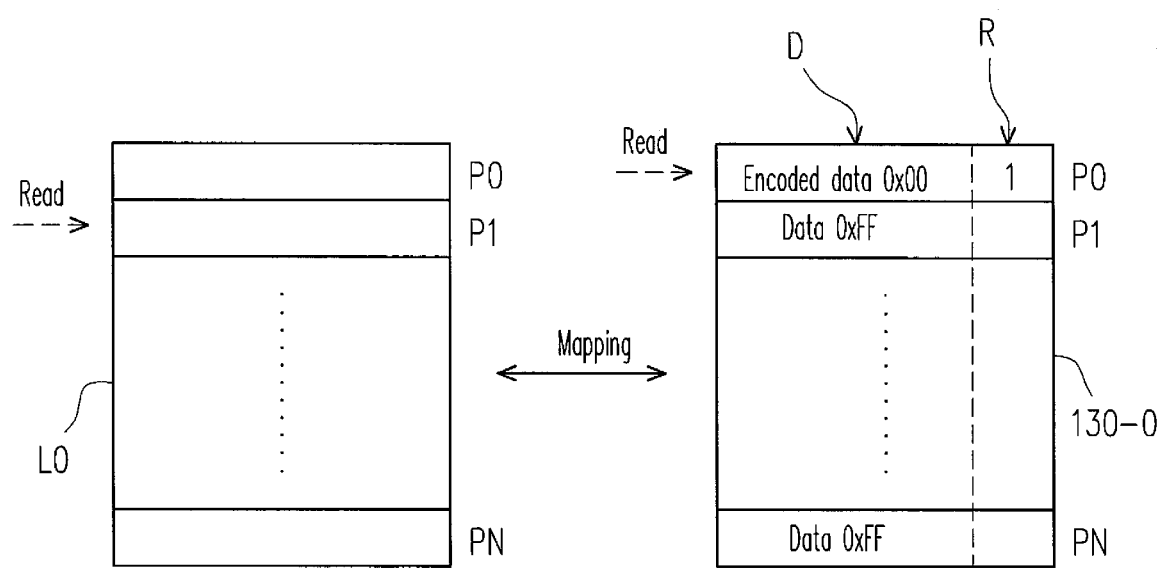
FIG. 3B is a diagram illustrating how a host changes to read another page according to the first embodiment of the present invention.

If it is determined in step S305 that the physical block corresponding to the logical block to be read is a new block, then in step S307, the memory management module 110*b* reads data from the first page of the physical block corresponding to the logical block to be read and transmits the data to the host 200. For example, as shown in FIG. 3B, when the host 200 desires to read a page P1 of a logical block L0, the memory management module 110*b* determines that the physical block 130-0 corresponding to the logical block L0 is a new block according to the indicator "1" in the page P0 of the physical block 130-0. Thus, the memory management module 110*b* reads data from the page P0 of the physical block 130-0 instead of the page P1 of the physical block 130-0.

If it is determined in step S305 that the physical block corresponding to the logical block to be read is not a new block, then in step S309, the memory management module 110*b* reads data from the physical block and the page thereof corresponding to the logical block and the page thereof obtained from the read command and transmits the data to the host 200.

[Second Embodiment]

As described above, in the first embodiment, when it is determined that the physical block to be read is a new block, data 0x00 previously written into the physical block is read by changing the page to be read in the physical block so as to prevent the host from reading garbled code. However, this purpose may also be achieved by changing the physical block to be read.

As described above, during the card activation process, all the physical blocks of the flash memory 130 are initialized and data stored therein are set to be 0xFF. Besides, according to the present embodiment, the memory management module 110*b* indicates that the physical block corresponding to each logical block is a new block in the logical-physical mapping table. For example, "1" is recorded in one bit of each record in the logical-physical mapping table for indicating that the physical block is a new block (as shown in FIG. 4B), and when subsequently a data is written into the physical block which is indicated as a new block during the operation of the flash memory storage system 100, the indicator is changed to "0" to indicate that the physical block is not a new block. Meanwhile, in the present embodiment, the memory management module 110*b* selects a physical block (for example, the physical block 130-N in FIG. 4C) from the spare area 206 of the flash memory and writes data 0x00 into all the pages of the selected physical block. In particular, the data 0x00 is encoded by the data perturbation module 110*e* before it is written into all the pages of the selected physical block.

In the present embodiment, when the host 200 desires to read data from the flash memory storage system 100, the memory management module 110*b* determines whether a physical block corresponding to the page to be read by the host 200 is a new block, and if the physical block corresponding to the page to be read is a new block, the memory management module 110*b* reads data from the corresponding page in the selected physical block and transmits the data to the host 200. In the present embodiment, if the physical block corresponding to a page to be read is a new block, the memory management module 110*b* reads data from a physical block which is previously written with data 0x00 and transmits the data to the host. Thereby, the host is prevented from reading garbled code.

Figure 4A:
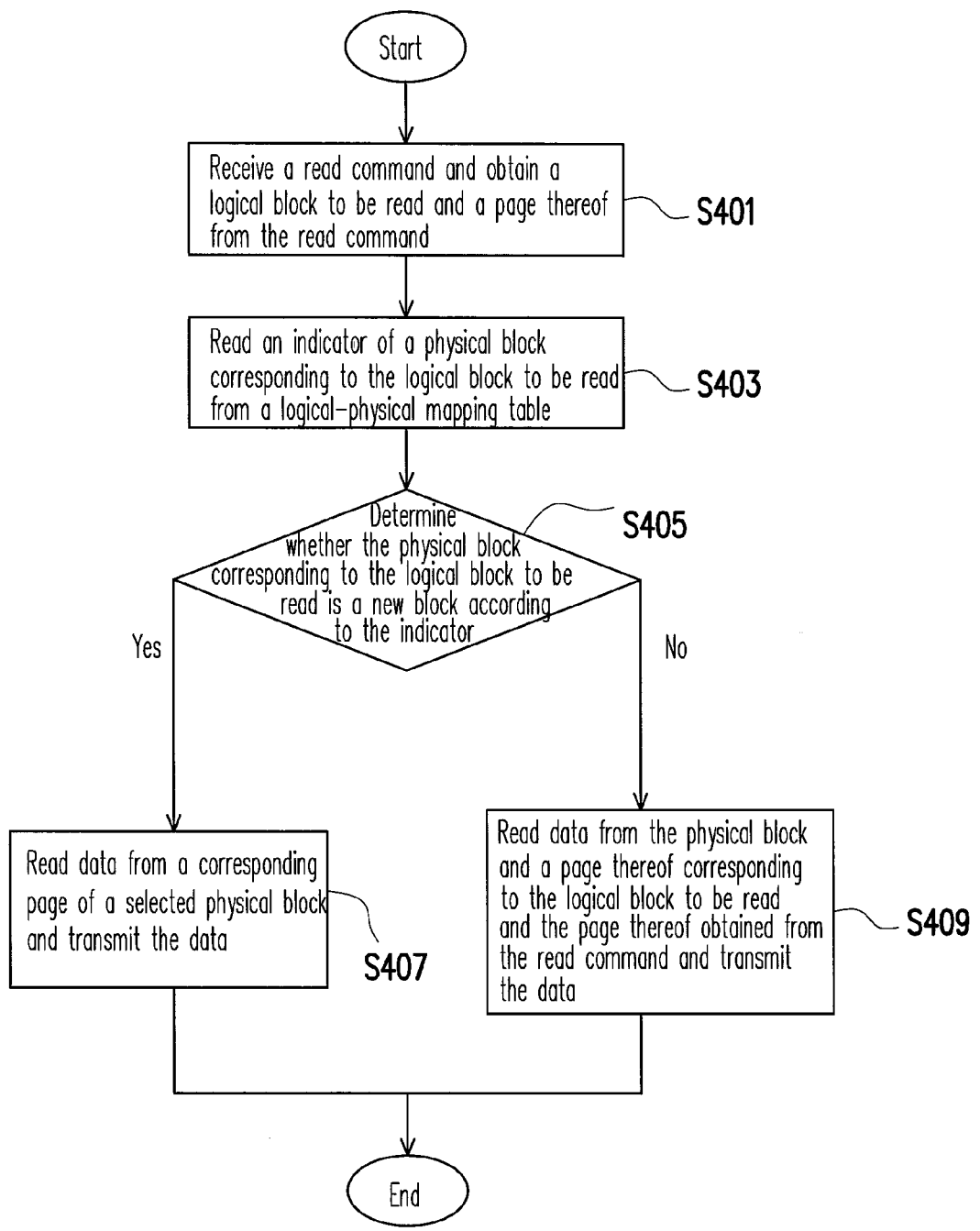
FIG. 4A is a flowchart of a data accessing method according to a second embodiment of the present invention.

FIG. 4A is a flowchart of a data accessing method according to the second embodiment of the present invention.

Referring to FIG. 4A, in step S401, the flash memory storage system 100 receives a read command from the host 200, and the microprocessor unit 110*a* obtains a logical block to be read and a page thereof from the read command. Then, in step S403, the memory management module 110*b* reads an indicator of a physical block corresponding to the logical block to be read from the logical-physical mapping table, and in step S405, the memory management module 110*b* determines whether the physical block corresponding to the logical block to be read is a new block according to the indicator.

Figure 4C:
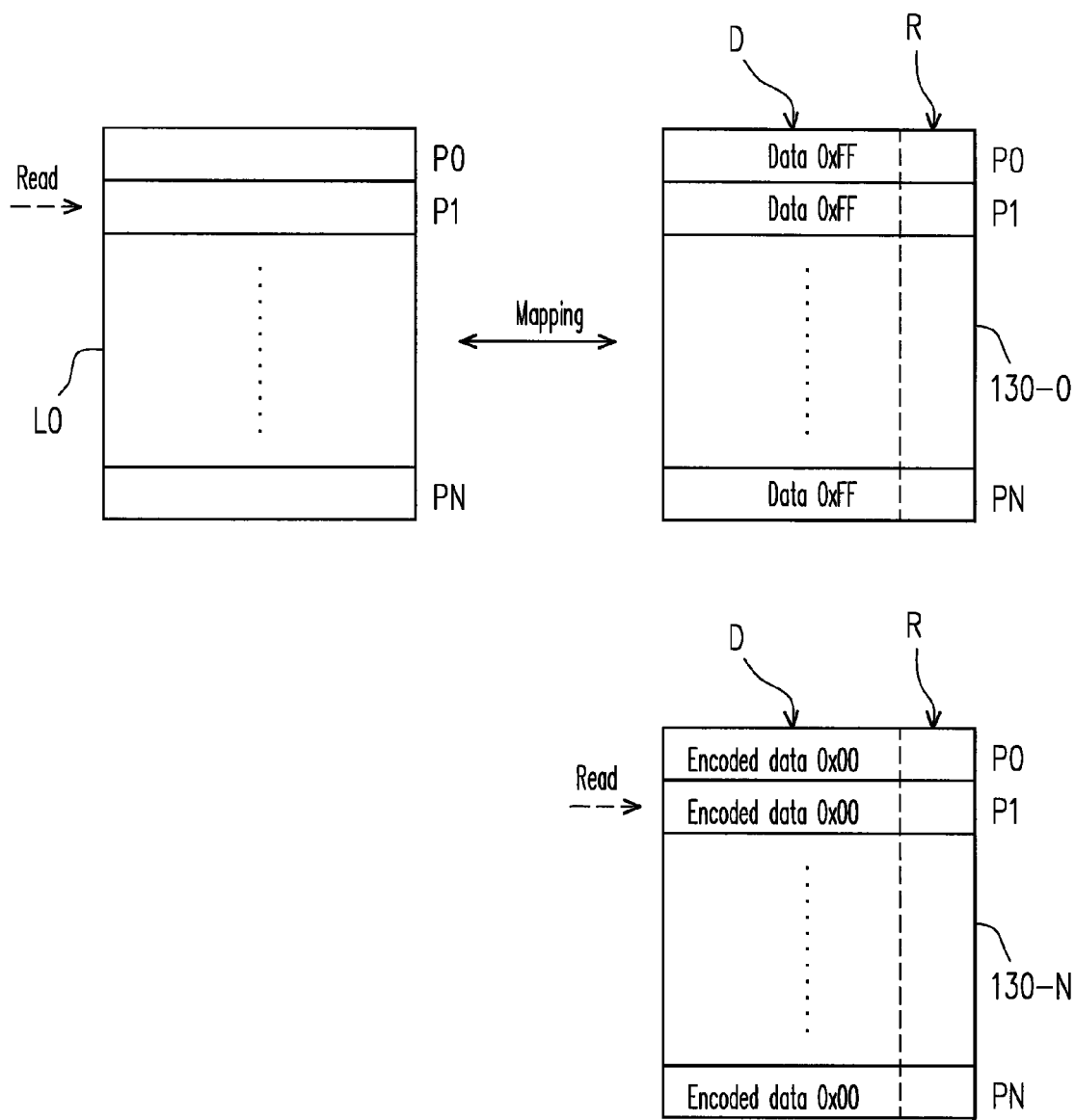
FIG. 4C is a diagram illustrating how a host changes to read another physical block according to the second embodiment of the present invention.

If the memory management module 110*b* determines that the physical block corresponding to the logical block to be read is a new block in step S405, then in step S407, the memory management module 110*b* reads data from the corresponding page in the selected physical block and transmits the data to the host. For example, as shown in FIG. 4C, when the host 200 is about to read data from the page P1 of the logical block L0, the memory management module 110*b* determines that the physical block 130-0 is a new block according to the indicator "1" in the logical-physical mapping table. Thus, the memory management module 110*b* reads data from the page P1 of the physical block 130-N which is previously written with data 0x00 instead of the page P1 of the physical block 130-0.

If the memory management module 110*b* determines that the physical block corresponding to the logical block to be read is not a new block in step S405, then in step S409, the memory management module 110*b* reads data from the physical block and the page thereof corresponding to the logical block to be read and the page thereof obtained from the read command and transmits the data to the host 200.

[Third Embodiment]

In the first embodiment and the second embodiment described above, whether a physical block to be read is a new block is determined according to an indicator recorded in the redundant area of a first page in the physical block or the logical-physical mapping table. Additionally, whether the physical block is a new block may also be determined according to the data read from the physical block.

In the present embodiment, during the card activation process of the flash memory storage system 100, the memory management module 110*b* decodes the data 0xFF in each initialized physical block by using the data perturbation module 110*e* and records the decoded data in a decode table. When subsequently the controller 110 reads data from a physical block according to a read command received from the host 200, the memory management module 110*b* can determine whether the physical block is a new block by comparing the data read from the physical block and the data recorded in the decode table.

In addition, in the first embodiment and the second embodiment described above, the previously written data 0x00 is read by respectively changing the page and the physical block to be read so as to prevent the host from reading the garbled code. However, in the present embodiment, the memory management module 110*b* may respond to the read command by directly transmitting the data 0x00 to the host when it determines that the physical block corresponding to the logical block to be read is a new block, wherein the instruction for changing the data in the memory management module 110*b* may be implemented as a hardware or a firmware.

Figure 5:
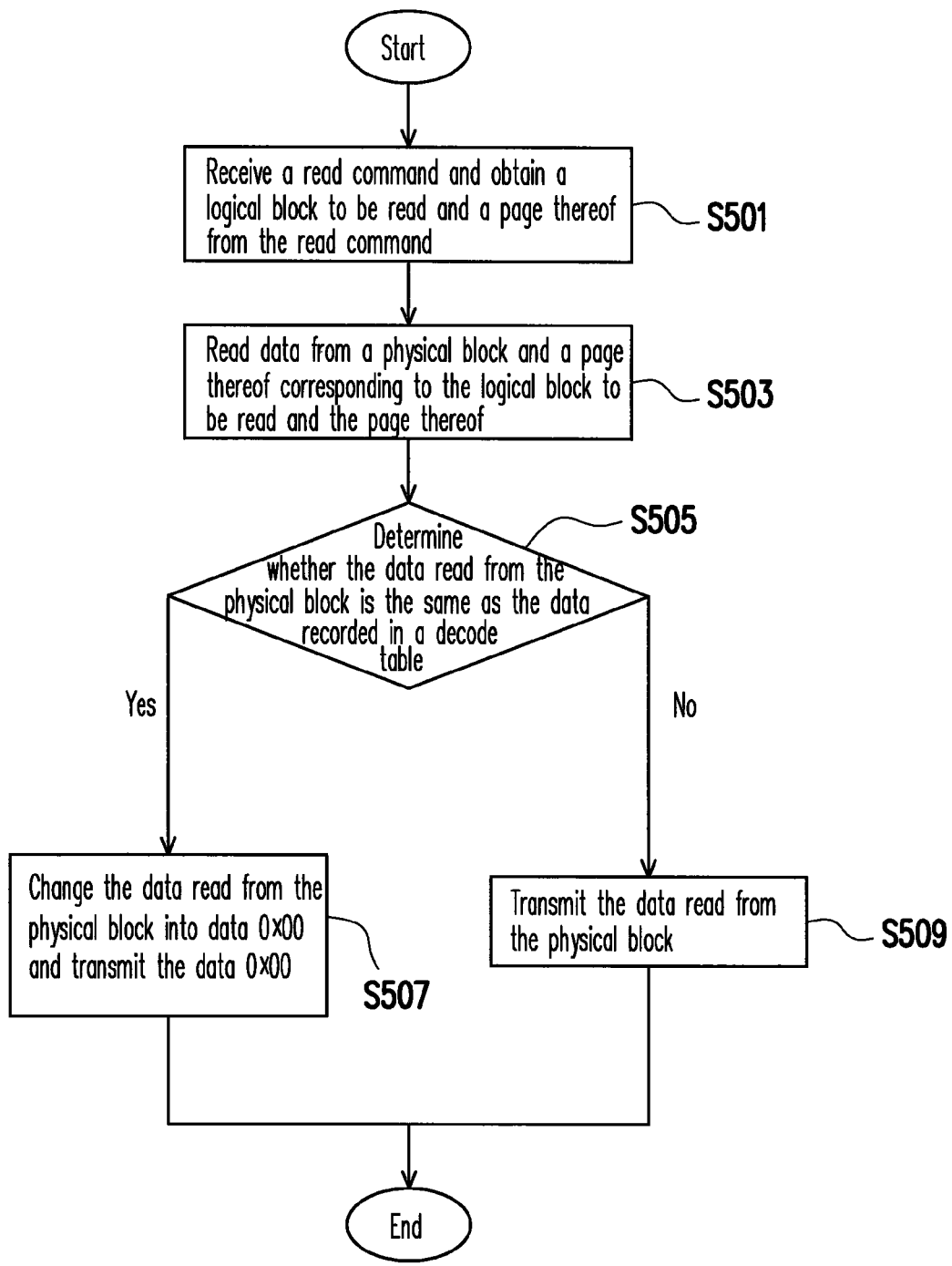
FIG. 5 is a flowchart of a data accessing method according to a third embodiment of the present invention.

FIG. 5 is a flowchart of a data accessing method according to the third embodiment of the present invention.

Referring to FIG. 5, in step S501, the flash memory storage system 100 receives a read command from the host 200, and the microprocessor unit 110*a* obtains a logical block to be read and a page thereof from the read command. Then, in step S503, the memory management module 110*b* reads data from a physical block and a page thereof corresponding to the logical block to be read and the page thereof. Next, in step S505, the memory management module 110*b* determines whether the data read from the physical block is the same as the data in the decode table, wherein the memory management module 110*b* determines that the physical block corresponding to the logical block to be read is a new block if the data read from the physical block is the same as the data in the decode table.

If the comparison in step S505 shows that the data read from the physical block is the same as the data in the decode table, then in step S507, the data read from the physical block is changed to 0x00, and the data 0x00 is transmitted to the host 200.

If the comparison in step S505 shows that the data read from the physical block is different from the data in the decode table, then in step S509, the data read from the physical block is transmitted to the host 200.

In overview, according to the data accessing method provided by the present invention, whether a physical block is a new block is determined before a data is transmitted to an end-user system, and if the physical block is a new block, data 0x00 is transmitted to the end-user system by changing the page or physical block to be read or directly producing the data 0x00. Thereby, the end-user system is prevented from reading garbled codes from a new block in a flash memory storage system having a data perturbation module.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data accessing method, for a flash memory storage device having a data perturbation module, wherein a flash memory of the flash memory storage device has a plurality of blocks, the data accessing method comprising:
   receiving a read command from a host, wherein the read command indicates reading data from a first block among the blocks;
   determining whether the first block is a new block;
   transmitting a predetermined data to the host if the first block is the new block; and
   decoding data read from the first block by the data perturbation module and transmitting the decoded data to the host if the first block is not the new block.

2. The data accessing method according to claim 1, wherein the step of determining whether the first block is the new block comprises:
   determining whether the first block is the new block according to an indicator corresponding to the first block.

3. The data accessing method according to claim 2, further comprising:
   recording indicators for the blocks to indicate that the blocks are the new block during a card activation process performed to the flash memory storage device.

4. The data accessing method according to claim 3, wherein the indicators are recorded in a logical-physical mapping table or redundant areas of the blocks.

5. The data accessing method according to claim 1, wherein the predetermined data is different from an initial value stored in the blocks.

6. The data accessing method according to claim 1, further comprising writing the predetermined data into at least one page of a second block of the blocks in the flash memory during a card activation process performed to the flash memory storage device,
   wherein the data accessing method further comprises:
   before transmitting the predetermined data to the host if the first block is the new block, reading data from the second block and decoding the data read from the second block by the data perturbation module to obtain the predetermined data.

7. The data accessing method according to claim 1, wherein the new block is a block not written with data from the host or a block being at an initial state due to a card activation process.

8. A data accessing method, for a flash memory storage device having a data perturbation module, wherein a flash memory of the flash memory storage device has a plurality of physical blocks, the data accessing method comprising:
   receiving a read command from a host, wherein the read command indicates reading data from a logical block;
   determining whether a physical block corresponding to the logical block to be read is a new block; and
   transmitting a predetermined data to the host if the physical block corresponding to the logical block to be read is the new block, wherein the predetermined data is obtained by decoding data stored in the flash memory through the data perturbation module.

9. The data accessing method according to claim 8, wherein the step of determining whether the physical block corresponding to the logical block to be read is the new block comprises:
determining whether the physical block corresponding to the logical block to be read is the new block according to an indicator corresponding to the physical block.

10. The data accessing method according to claim 9, further comprising:
recording indicators for the physical blocks to indicate that the physical blocks are the new block during a card activation process performed to the flash memory storage device.

11. The data accessing method according to claim 10, wherein the indicators are recorded in a logical-physical mapping table or redundant areas of the physical blocks.

12. The data accessing method according to claim 8, wherein the predetermined data is different from an initial value stored in the physical blocks.

13. The data accessing method according to claim 8, further comprising writing the predetermined data into at least one page of another physical block among the physical blocks in the flash memory during a card activation process performed to the flash memory storage device,
wherein the data accessing method further comprises:
before transmitting the predetermined data to the host if the physical block in the data area corresponding to the logical block to be read is the new block, reading data from the another physical block and decoding the data read from the another physical block by the data perturbation module to obtain the predetermined data.

14. The data accessing method according to claim 8, wherein the new block is a block not written with data from the host or a block being at an initial state due to a card activation process.

15. A controller, for a flash memory storage device having a flash memory, wherein the flash memory has a plurality of blocks, the controller comprising:
a microprocessor unit, configured to receive a read command from a host, wherein the read command indicates reading data from a first block among the blocks;
a data perturbation module, electrically connected to the microprocessor unit for decoding data read from the flash memory;
a flash memory interface, electrically connected to the microprocessor unit for accessing the flash memory;
a buffer memory, electrically connected to the microprocessor unit for temporarily storing data; and
a memory management module, electrically connected to the microprocessor unit and configured to determine whether the first block is a new block,
wherein if the first block is the new block, the memory management module transmits a predetermined data to the host.

16. The controller according to claim 15, wherein the memory management module determines whether the first block is the new block according to an indicator corresponding to the first block.

17. The controller according to claim 16, wherein the memory management module recording indicators for the blocks to indicate that the blocks are the new block during a card activation process performed to the flash memory storage device.

18. The controller according to claim 17, wherein the indicators are recorded in a logical-physical mapping table or redundant areas of the blocks.

19. The controller according to claim 15, wherein the predetermined data is different from an initial value stored in the blocks.

20. The controller according to claim 15, wherein the memory management module writes the predetermined data into at least one page of a second block of the blocks in the flash memory during a card activation process performed to the flash memory storage device,
wherein before transmitting the predetermined data to the host if the first block is the new block, the memory management module reads data from the second block and decodes the data read from the second block by the data perturbation module to obtain the predetermined data.

21. The controller according to claim 15, wherein the new block is a block not written with data from the host or a block being at an initial state due to a card activation process.

22. A controller, for a flash memory storage device having a data perturbation module, wherein a flash memory of the flash memory storage device has a plurality of physical blocks, the controller comprising:
a microprocessor unit, configured to receive a read command from a host, wherein the read command indicates reading data from a logical block;
a data perturbation module, electrically connected to the microprocessor unit for decoding data read from the flash memory;
a flash memory interface, electrically connected to the microprocessor unit for accessing the flash memory;
a buffer memory, electrically connected to the microprocessor unit for temporarily storing data; and
a memory management module, electrically connected to the microprocessor unit and configured to determine whether a physical block corresponding to the logical block to be read is a new block,
wherein if the physical block corresponding to the logical block to be read is the new block, the memory management module transmits a predetermined data to the host,
wherein the predetermined data is obtained by decoding data stored in the flash memory through the data perturbation module.

23. The controller according to claim 22, wherein the memory management module determines whether the physical block corresponding to the logical block to be read is the new block according to an indicator corresponding to the physical block.

24. The controller according to claim 23, wherein the memory management module records indicators for the physical blocks to indicate that the physical blocks are the new block during a card activation process performed to the flash memory storage device.

25. The controller according to claim 24, wherein the indicators are recorded in a logical-physical mapping table or redundant areas of the physical blocks.

26. The controller according to claim 22, wherein the predetermined data is different from an initial value stored in the physical blocks.

27. The controller according to claim 22, wherein the memory management module writes the predetermined data into at least one page of another physical block among the physical blocks in the flash memory during a card activation process performed to the flash memory storage device,
wherein before transmitting the predetermined data to the host if the physical block corresponding to the logical block to be read is the new block, the memory management module reads data from the another physical block and decodes the data read from the another physical block by the data perturbation module to obtain the predetermined data.

28. The controller according to claim 22, wherein the new block is a block not written with data from the host or a block being at an initial state due to a card activation process.

29. A flash memory storage system, comprising:
a flash memory configured to store data, wherein the flash memory has a plurality of blocks;
a connector configured to connect to a host; and
a controller electrically connected to the flash memory and the connector, and configured to receive a read command from the host, wherein the read command indicates reading data from a first block among the blocks,
wherein the controller determines whether the first block is a new block,
wherein if the first block is the new block, the controller transmits a predetermined data to the host,
wherein the controller has a data perturbation module for decoding data read from the flash memory.

30. The flash memory storage system according to claim 29, wherein the controller determines whether the first block is the new block according to an indicator corresponding to the first block.

31. The flash memory storage system according to claim 30, wherein the controller recording indicators for the blocks to indicate that the blocks are the new block during a card activation process performed to the flash memory storage system.

32. The flash memory storage system according to claim 31, wherein the indicators are recorded in a logical-physical mapping table or redundant areas of the blocks.

33. The flash memory storage system according to claim 29, wherein the predetermined data is different from an initial value stored in the blocks.

34. The flash memory storage system according to claim 29, wherein the controller writes the predetermined data into at least one page of a second block of the blocks in the flash memory during a card activation process performed to the flash memory storage system,
wherein before transmitting the predetermined data to the host if the first block is the new block, the controller reads data from the second block and decodes the data read from the second block by the data perturbation module to obtain the predetermined data.

35. The flash memory storage system according to claim 29, wherein the new block is a block not written with data from the host or a block being at an initial state due to a card activation process.

36. A flash memory storage system, comprising:
a flash memory configured to store data, wherein the flash memory has a plurality of physical blocks;
a connector configured to connect to a host; and
a controller electrically connected to the flash memory and the connector, and configured to receive a read command from the host, wherein the read command indicates reading data from a logical block,
wherein the controller determines whether a physical block corresponding to the logical block to be read is a new block,
wherein if the physical block corresponding to the logical block to be read is the new block, the controller transmits a predetermined data to the host, wherein the predetermined data is obtained by decoding data stored in the flash memory through a data perturbation module of the controller.

37. The flash memory storage system according to claim 36, wherein the controller determines whether the physical block corresponding to the logical block to be read is the new block according to an indicator corresponding to the physical block.

38. The flash memory storage system according to claim 37, wherein the controller records indicators for the physical blocks to indicate that the physical blocks are the new block during a card activation process performed to the flash memory storage system.

39. The flash memory storage system according to claim 38, wherein the indicators are recorded in a logical-physical mapping table or redundant areas of the physical blocks.

40. The flash memory storage system according to claim 36, wherein the predetermined data is different from an initial value stored in the physical blocks.

41. The flash memory storage system according to claim 36, wherein the controller writes the predetermined data into at least one page of another physical block among the physical blocks in the flash memory during a card activation process performed to the flash memory storage system,
wherein before transmitting the predetermined data to the host if the physical block corresponding to the logical block to be read is the new block, the controller reads data from the another physical block and decodes the data read from the another physical block by the data perturbation module to obtain the predetermined data.

42. The flash memory storage system according to claim 36, wherein the new block is a block not written with data from the host or a block being at an initial state due to a card activation process.

* * * * *